United States Patent
Hayhow et al.

(10) Patent No.: US 9,792,593 B2
(45) Date of Patent: Oct. 17, 2017

(54) SYSTEM AND METHOD FOR PROCESSING AN ONLINE TRANSACTION REQUEST

(75) Inventors: Robert Hayhow, Burlington (CA); Giovanna Borsella, Etobicoke (CA)

(73) Assignee: THE TORONTO-DOMINION BANK, Toronto (CA)

( * ) Notice: Subject to any disclaimer, the term of this patent is extended or adjusted under 35 U.S.C. 154(b) by 98 days.

(21) Appl. No.: 13/303,507

(22) Filed: Nov. 23, 2011

(65) Prior Publication Data

US 2013/0132283 A1    May 23, 2013

(51) Int. Cl.
| | |
|---|---|
| *G06Q 20/00* | (2012.01) |
| *G06Q 20/10* | (2012.01) |
| *G06Q 20/02* | (2012.01) |
| *G06Q 20/12* | (2012.01) |
| *G06Q 20/20* | (2012.01) |
| *G06Q 20/38* | (2012.01) |
| *G06Q 20/40* | (2012.01) |

(52) U.S. Cl.
CPC ....... *G06Q 20/1085* (2013.01); *G06Q 20/027* (2013.01); *G06Q 20/10* (2013.01); *G06Q 20/102* (2013.01); *G06Q 20/12* (2013.01); *G06Q 20/20* (2013.01); *G06Q 20/385* (2013.01); *G06Q 20/38215* (2013.01); *G06Q 20/401* (2013.01)

(58) Field of Classification Search
CPC .................................................. G06Q 20/027
USPC .......................................................... 705/50
See application file for complete search history.

(56) References Cited

U.S. PATENT DOCUMENTS

| | | |
|---|---|---|
| 5,924,080 A | 7/1999 | Johnson |
| 7,225,156 B2 | 5/2007 | Fisher et al. |
| 7,353,382 B2 | 4/2008 | Labrou et al. |
| RE40,444 E | 7/2008 | Linehan |
| 7,635,084 B2 | 12/2009 | Wang et al. |
| 7,665,660 B2 | 2/2010 | Degliantoni et al. |

(Continued)

FOREIGN PATENT DOCUMENTS

WO    WO2012054785 A1    4/2012

OTHER PUBLICATIONS

Wikinews, Chip and PIN "not fit for purpose", says Cambridge researcher, Feb. 14, 2012, pp. 1 to 3, http://en.wikinews.org/.

(Continued)

*Primary Examiner* — Charles C Agwumezie
(74) *Attorney, Agent, or Firm* — Knobbe Martens Olson & Bear LLP

(57) ABSTRACT

A method of processing an online transaction request involves a network gateway generating a revised transaction request from an incoming transaction request that is received from a client terminal. The revised transaction request includes a revised transaction message that is derived from the incoming transaction request and a revised transaction request cryptogram that is generated from the revised transaction message. The revised transaction request cryptogram is uniquely associated with an identity token that is interfaced with the client terminal. The network gateway receives a transaction authorization from an issuer server for the revised transaction request, and provides a revised transaction authorization message to the client terminal in accordance with the received transaction authorization. The revised transaction authorization message provides an indication of authorization of the revised transaction request.

24 Claims, 6 Drawing Sheets

(56) References Cited

U.S. PATENT DOCUMENTS

| | | | |
|---|---|---|---|
| 7,765,162 B2 * | 7/2010 | Binder | G06Q 20/04 705/64 |
| 7,849,020 B2 | 12/2010 | Johnson | |
| 7,870,065 B2 | 1/2011 | Gutierrez-Sheris | |
| 8,090,654 B2 | 1/2012 | Ward et al. | |
| 2002/0023215 A1 | 2/2002 | Wang et al. | |
| 2002/0049670 A1 | 4/2002 | Moritsu et al. | |
| 2003/0069836 A1 * | 4/2003 | Penney et al. | 705/37 |
| 2004/0019522 A1 * | 1/2004 | Bortolin | G06Q 30/02 705/14.33 |
| 2005/0055270 A1 | 3/2005 | Broe | |
| 2005/0080728 A1 * | 4/2005 | Sobek | 705/39 |
| 2005/0262026 A1 | 11/2005 | Watkins | |
| 2008/0217397 A1 * | 9/2008 | Degliantoni | G06Q 30/02 235/380 |
| 2009/0070171 A1 * | 3/2009 | Patterson | G06Q 20/108 705/75 |
| 2009/0300738 A1 * | 12/2009 | Dewe et al. | 726/6 |
| 2010/0036741 A1 | 2/2010 | Cleven | |
| 2010/0042488 A1 | 2/2010 | McClung, III | |
| 2010/0076836 A1 * | 3/2010 | Giordano et al. | 705/14.38 |
| 2010/0161404 A1 | 6/2010 | Taylor et al. | |
| 2010/0174620 A1 | 7/2010 | Stringfellow et al. | |
| 2011/0208656 A1 * | 8/2011 | Alba | G06Q 20/12 705/65 |
| 2011/0307381 A1 | 12/2011 | Kim et al. | |
| 2011/0307388 A1 | 12/2011 | Kim et al. | |
| 2012/0101881 A1 * | 4/2012 | Taylor | G06Q 20/12 705/14.13 |
| 2013/0124287 A1 * | 5/2013 | Bjorn | G06Q 30/0215 705/14.23 |

OTHER PUBLICATIONS

BPS, Gift & Loyalty Card Program, 2010, pp. 1 to 2, 2C Processor USA, LLC, U.S.A.

CSFI, u/SWITCHWARE Enterprise Transaction Processing and Management System, EMV and Smart Card Support, 2007, pp. 1 to 3, CSF Internatinal, Inc., Florida, U.S.A.

EMVCo, A Guide to EMV, 2001, pp. 1 to 35, EMVCo, LLC, U.K.

Torrubia, Andres et al. "Cryptography Regulations for E-commerce . . . ", vol. 20 Issue 8, Dec. 1, 2001, pp. 724-738, http://www.sciencedirect.com/science/article/pii/S0167404801008148.

Wrona, Konrad et al. "Mobile Payment State of the Art and Open Problems" Electronic Commerce. Comp. Sci. 01, vol. 2232/2001, 88-100, DOI: 10.1007/3-540-45598-1_10.

* cited by examiner

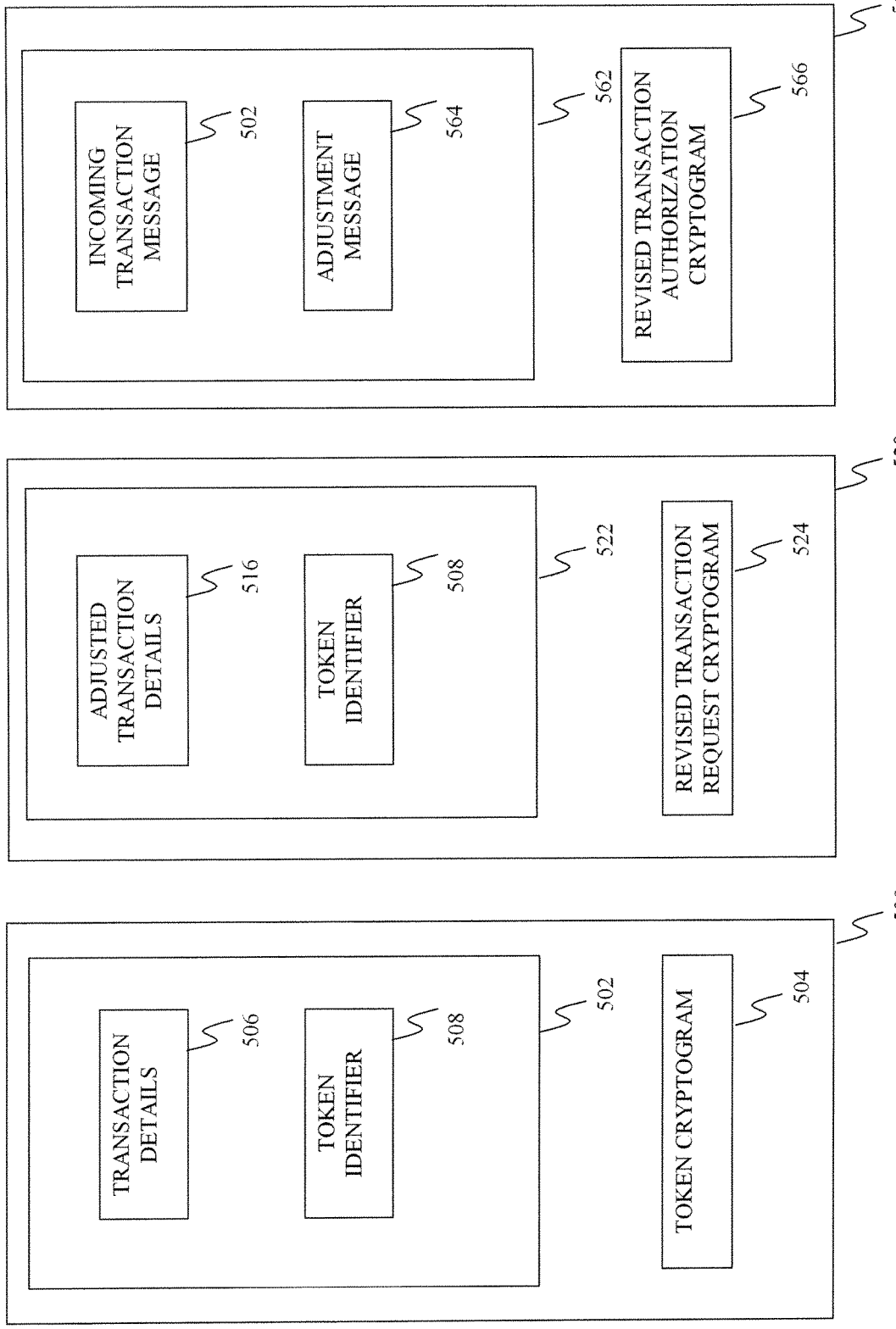

SYSTEM AND METHOD FOR PROCESSING AN ONLINE TRANSACTION REQUEST

FIELD

This patent application relates to a system and method for processing an online transaction. In particular, this patent application describes a system and method for processing an online transaction that is initiated with a hardware token.

BACKGROUND

The conventional method of processing an online transaction involves a consumer initiating an online transaction request by presenting a hardware token (e.g. credit or debit card) at a merchant's point-of-sale (POS) terminal, and the POS providing the merchant's acquirer with particulars of the transaction (e.g. payment amount, and account number associated with the hardware token). The issuer of the hardware token receives the transaction particulars from the merchant's acquirer and approves or rejects the transaction request after considering several factors, including whether the account has sufficient credit/funds to complete the transaction.

To increase revenue, a merchant might issue coupons or flyers advertising discounts or loyalty points that are available on the purchase of the merchant's wares/services. Typically, the advertisements are delivered on large scale, without regards to the consumer preferences or purchasing history.

Fidelisoft (WO 20011/006258) describes a system and method for processing an online transaction in which a consumer presents a credit or debit card at a POS, and a central server provides the consumer with a plurality of transaction scenarios (e.g. discounts, loyalty points) at the POS based on the consumer's predefined preference profile. The POS provides the acquirer with the particulars of the consumer's selected transaction, for subsequent processing by the issuer. Although this solution allows advertisements to be presented to consumers based on each consumer's preferences, the solution requires the POS to issue both an initial transaction request and a subsequent selected transaction request to the acquirer. Therefore, the proposed solution cannot be implemented with existing POS devices.

SUMMARY

By way of overview, in a first aspect this disclosure relates to a method of processing an online transaction request. In this first aspect, the network gateway generates a revised transaction request from an incoming transaction request that is transmitted from a client terminal. The revised transaction request includes a revised transaction message that is derived from the incoming transaction request, and a revised transaction request cryptogram that is generated from the revised transaction message. The revised transaction request cryptogram is uniquely associated with an identity token that is interfaced with the client terminal.

The network gateway receives a transaction authorization from an issuer server for the revised transaction request, and provides a revised transaction authorization message to the client terminal in accordance with the received transaction authorization. The revised transaction authorization message provides an indication of authorization of the revised transaction request.

In a second aspect, this disclosure relates to a computer-readable medium that comprises computer processing instructions that are stored thereon for execution by a computer. The computer processing instructions, when executed by the computer, cause the computer to perform a method of processing an online transaction request. In this second aspect, the computer generates a revised transaction request from an incoming transaction request that is transmitted from a client terminal. The revised transaction request includes a revised transaction message that is derived from the incoming transaction request, and a revised transaction request cryptogram that is generated from the revised transaction message. The revised transaction request cryptogram is uniquely associated with an identity token that is interfaced with the client terminal.

The computer receives a transaction authorization from an issuer server for the revised transaction request, and provides a revised transaction authorization message to the client terminal in accordance with the received transaction authorization. The revised transaction authorization message provides an indication of authorization of the revised transaction request.

In a third aspect, this disclosure relates to a network gateway that includes a primary network interface, a secondary network interface, and a transaction processor that is coupled to the primary and secondary network interfaces. The primary network interface interfaces the network gateway with a primary network. The secondary network interface interfaces the network gateway with a secondary network.

In this third aspect, the transaction processor is configured to generate a revised transaction request from an incoming transaction request that is received from a client terminal via the primary network. The revised transaction request includes a revised transaction message that is derived from the incoming transaction request, and a revised transaction request cryptogram that is generated from the revised transaction message. The revised transaction request cryptogram is uniquely associated with an identity token that is interfaced with the client terminal.

The transaction processor is configured to receive a transaction authorization for the revised transaction request from the issuer server via the secondary network, and to provide a revised transaction authorization message to the client terminal via the primary network in accordance with the received transaction authorization. The revised transaction authorization message provides an indication of authorization of the revised transaction request.

In a fourth aspect, this disclosure relates to an online transaction processing network that includes a client terminal, an issuer server, and a network gateway. The client terminal is configured to communicate with an identity token that is interfaced with the client terminal.

In this fourth aspect, the network gateway is configured to generate a revised transaction request from an incoming transaction request that is received from the client terminal. The revised transaction request includes a revised transaction message that is derived from the incoming transaction request, and a revised transaction request cryptogram that is generated from the revised transaction message. The revised transaction request cryptogram is uniquely associated with the identity token.

The network gateway is configured to receive a transaction authorization from the issuer server for the revised transaction request, and to provide a revised transaction authorization message to the client terminal in accordance with the received transaction authorization. The revised transaction authorization message provides an indication of authorization of the revised transaction request.

In one implementation, the network gateway is configured to generate the revised transaction request by transmitting a portion of the incoming transaction request to a computer server, receiving an adjustment message from the computer server and generating the revised transaction message from the adjustment message and the incoming transaction request. The incoming transaction request may include an identification number, and the computer server may generate the adjustment message from at least the identification number.

Preferably, the network gateway is configured to generate the revised transaction request cryptogram from a token cryptographic key that is uniquely associated with the identity token. The network gateway may be configured to generate the token cryptographic key from the identification number. The network gateway may also be configured to generate the revised transaction request cryptogram from the incoming transaction request.

Preferably, the network gateway generates the revised transaction request upon validation of the identification number. Further, preferably the incoming transaction request includes an incoming transaction message, and the revised transaction authorization message includes the incoming transaction message and the adjustment message.

The incoming transaction request may include a token cryptogram, and the revised transaction authorization message may include a revised transaction authorization cryptogram. The network gateway may be configured to generate the revised transaction authorization cryptogram from the token cryptogram and the received transaction authorization. The issuer server may receive the revised transaction request from the network gateway, and may be configured to validate the revised transaction request from the revised transaction request cryptogram, and generate the transaction authorization in accordance with an outcome of the revised transaction request validating.

The network gateway may also be configured to generate the revised transaction request by verifying that the token cryptogram was generated by the identity token and generating the revised transaction request in accordance with an outcome of the verifying. The processing network may also include a front-end switch that is configured to direct the incoming transaction request to the network gateway in accordance with a data field of the incoming transaction request.

BRIEF DESCRIPTION OF THE DRAWINGS

The foregoing aspects will now be described, by way of example, with reference to the accompanying drawings, in which:

FIG. 6a is a schematic view of the incoming transaction request;

FIG. 6b is a schematic view of the revised transaction request;

FIG. 6c is a schematic view of the revised transaction authorization message.

DETAILED DESCRIPTION

Online Transaction Processing Network

Figure 1:
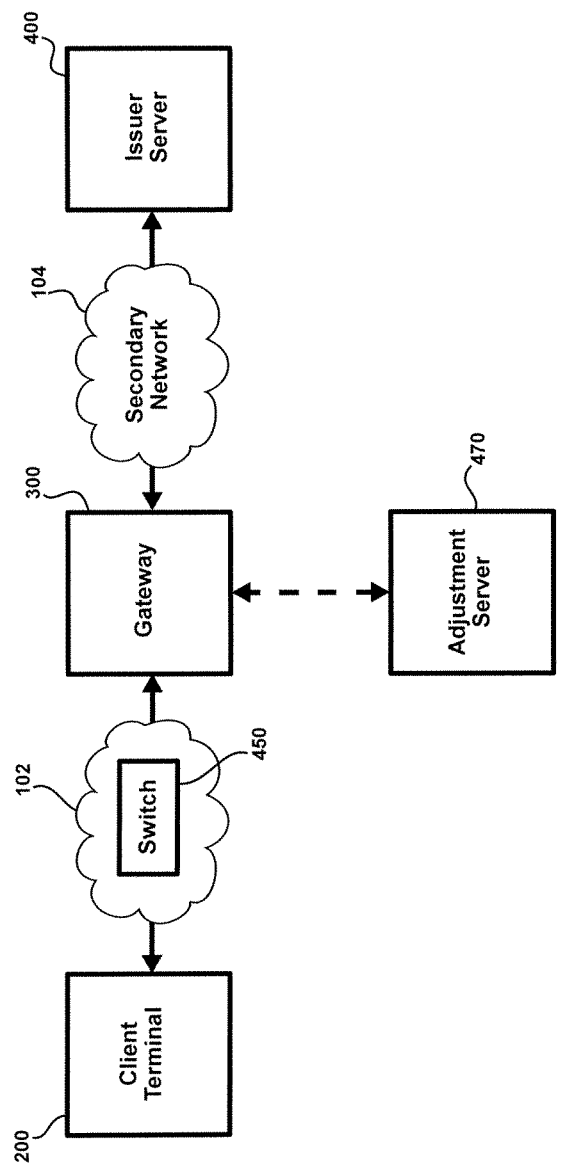
FIG. 1 is a block diagram that illustrates the interconnection of the client terminal, the network gateway and the issuer server (and the optional front-end switch and adjustment server) of the online transaction processing network.

Turning to FIG. 1, there is shown an online transaction processing network, denoted generally by reference number 100, that includes a client terminal 200, a network gateway 300, and an issuer server 400, and is configured to process an online transaction that is initiated by a user of one of the client terminals 200. As used herein, an "online transaction" is an electronic transaction (e.g. purchase of goods/services, bill payment, funds transfer) the particulars of which the merchant sends to an approval authority for authorization in real-time (as opposed to an "off-line transaction" the particulars of which the merchant sends to an approval authority for authorization at the end of the business day).

Although the transaction processing network 100 is shown comprising only a single client terminal 200, typically the transaction processing network 100 includes a plurality of the client terminals 200. Similarly, although the transaction processing network 100 is shown comprising only a single network gateway 300 and a single issuer server 400, the transaction processing network 100 may include a plurality of the network gateways 300 and a plurality of the issuer servers 400.

The network gateway 300 communicates with the client terminal(s) 200 via a primary communications network 102. Preferably, the primary communications network 102 comprises a secure packet-switched network. If the transaction processing network 100 includes a plurality of the network gateways 300, each network gateways 300 may communicate with a respective portion of the client terminal(s) 200 via a respective primary communications network 102. The primary communications network 102 may include a front-end switch 450 that is configured to direct transaction requests (received from the client terminals 200) to the appropriate network gateway 300 in accordance with a data field of the transaction request.

The issuer server 400 communicates with the network gateway 300 via a secondary communications network 104. Preferably, the secondary communications network 104 comprises a secure payment network. If the transaction processing network 100 includes a plurality of the issuer servers 400, each issuer server 400 may communicate with the network gateways 300 via a respective secondary communications network 104 (e.g. VisaNet, Mastercard Network).

The transaction processing network 100 may also include a computer server ("adjustment server") 470 that is in communication with each network gateway 300. As will be discussed below, each network gateway 300 uses the adjustment server 470 to generate a revised transaction request from a transaction request that the network gateway 300 receives from one of the client terminals 200 (e.g. via the front-end switch 450). Although the adjustment server 470 is shown as being distinct from the network gateway(s) 300, the functionality of the adjustment server 470 may be incorporated instead into the network gateway(s) 300.

Transaction Request Processing—Overview

Figure 2:
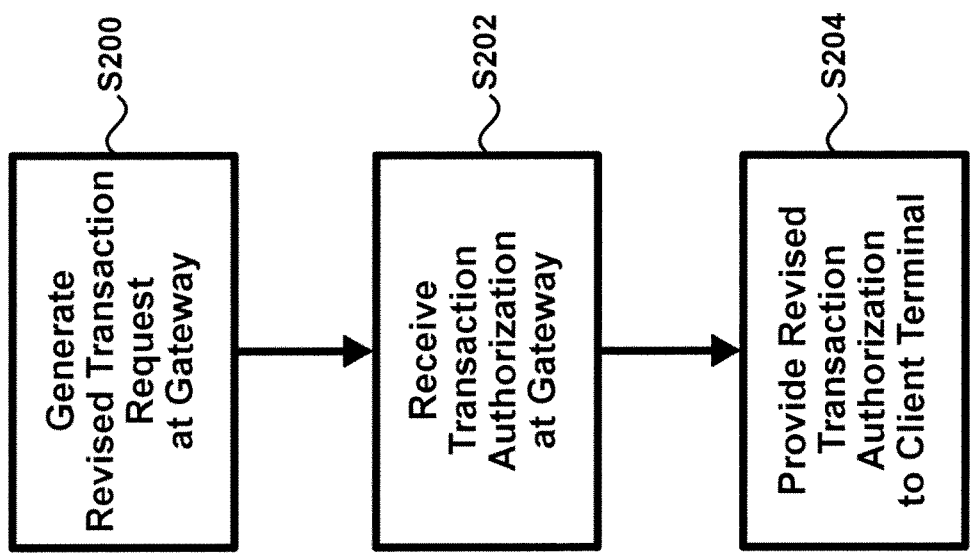
FIG. 2 is a flowchart that depicts, by way of overview, the transaction request processing method implemented by the online transaction processing network.

As will be discussed in further detail below, the online transaction processing network 100 uses the network gateway 300 and the issuer server 400 (and optionally the front-end switch 450 and the adjustment server 470) to implement a method of processing the transaction request that is transmitted from one of the client terminals 200. A sample embodiment of the transaction request processing method is depicted, by way of overview, in the flowchart shown in FIG. 2.

As shown therein, at step S200 the network gateway 300 generates a revised transaction request from a transaction request that is transmitted from one of the client terminals 200. The revised transaction request includes a revised transaction message that is derived from the transaction request transmitted by the client terminal 200. Typically, the transaction message that is transmitted by the client terminal 200 includes transaction details (e.g. payment amount, transaction date) of the requested online transaction.

The network gateway 300 may derive the revised transaction request by transmitting a portion of the transaction request to the adjustment server 470, receiving an adjustment message from the adjustment server 470 and generating the revised transaction message from the adjustment message and the incoming transaction request. The adjustment message may specify, for example, a discount amount to be applied to the payment amount specified in the transaction message that was transmitted by the client terminal 200.

The revised transaction request also includes a revised transaction request cryptogram that is generated from the revised transaction message. Preferably, the revised transaction request cryptogram is uniquely associated with an identity token that is interfaced with the client terminal 200.

At step S202, the network gateway 300 receives a transaction authorization for the revised transaction request from one of the issuer servers 400. Preferably, the issuer server 400 issues the transaction authorization after verifying that the revised transaction request cryptogram was generated by the identity token (even though the revised transaction request cryptogram was actually generated by the network gateway 300).

At step S204, the network gateway 300 provides a revised transaction authorization message to the client terminal 200 in accordance with the received transaction authorization. The revised transaction authorization message provides an indication of the authorization of the revised transaction request.

Client Terminal/Identity Token

Figure 3:
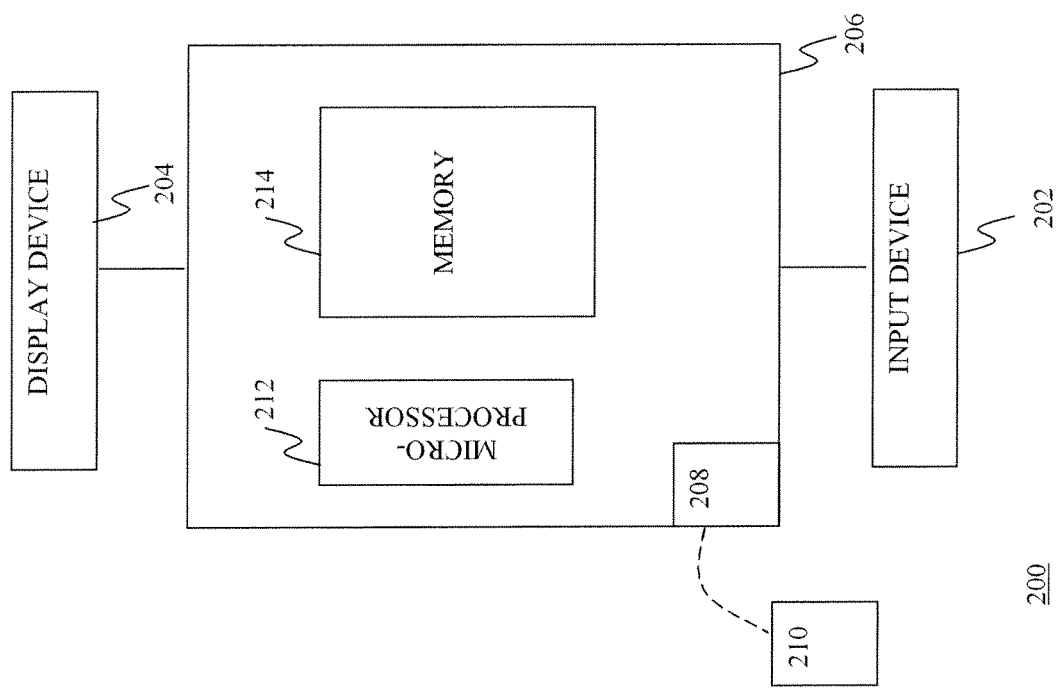
FIG. 3 is a schematic view of the client terminal.

The client terminal 200 comprises a networked computing device, and may be implemented as a point-of-sale (POS) terminal, and an automated teller machine (ATM), as examples. As shown in FIG. 3, the client terminal 200 may include an input device 202, a display device 204, and a computer processing unit 206 that is coupled to the input device 202 and the display device 204. The client terminal 200 may also include a token interface 208 that is coupled to the computer processing unit 206 and is configured to communicate with an identity token 210.

The input device 202 may be implemented as a keyboard, touchpad, touchscreen or other input device suitable for allowing a user of the client terminal 200 to input data and/or commands that may be required to initiate an online transaction. The display device 204 may be implemented as a liquid crystal display (LCD) panel, cathode ray tube (CRT) display, plasma display panel, or other display device suitable for displaying transaction information to the user.

The computer processing unit 206 may include a microprocessor 212 and computer-readable medium 214. The computer-readable medium 214 may be provided as electronic computer memory (e.g. FLASH memory) or optical or magnetic memory (e.g. compact disc, hard disk) and may include computer processing instructions stored thereon which, when executed by the microprocessor 212, define an operating system that allows the client terminal 200 to accept user input from the input device 202 and to control the display device 204 and the token interface 208.

The identity token 210 typically comprises a smartcard, chip card or integrated circuit card, and may be implemented in various forms, including a payment card, a credit card, and a loyalty card. Typically, the identity token 210 includes a built-in micro-controller and protected memory. The micro-controller and protected memory together provide a secure self-contained computing environment for running cryptographic (e.g. data encryption standard (DES), triple-DES, advanced encryption standard (AES)) algorithms. Alternately, the identity token 210 may be implemented in software executing on a personal computer or computer server.

Typically, the protected memory of the identity token 210 is configured with a personal identification number (PIN), a token identification number (e.g. payment card number, credit card number, loyalty card number), and may also store one or more cryptographic keys ("token cryptographic keys"). The identification numbers and the token cryptographic key(s) may be stored in the protected memory at the time the identity token 210 is manufactured or prior to delivery of the identity token 210 to the intended user. Preferably, the token identification number and the token cryptographic key(s) are uniquely associated with the identity token 210. Further, typically the cryptographic key is not publicly available, but is either known or can be re-generated only by the issuer of the identity token 210. As will be discussed below, to facilitate authorization of an online transaction initiated at the client terminal 200, typically the issuer of the identity token 210 also maintains or has access to the issuer server 400.

The identity token 210 uses the token identification number and the token cryptographic key(s) in the cryptographic algorithms to generate cryptograms ("token cryptograms") that are used by the transaction processing network 100 to authorize online transactions. As will be discussed, at the outset of an online transaction, the identity token 210 receives from the client terminal 200 a transaction message that includes transaction details (e.g. payment amount, transaction date) of the online transaction. The identity token 210 generates the token cryptogram for the online transaction by applying the transaction message and the token cryptographic key(s) as inputs to a suitable cryptographic algorithm. For example, the identity token 210 may generate the token cryptogram by computing a one-way hash of the transaction message, and encrypting the hash with the token cryptographic key(s). The identity token 210 then responds to the client terminal 200 with the token cryptogram for authorization of the online transaction.

The identity token 210 may be implemented with a contactless (e.g. NFC and/or ISO 14443 based) form factor and/or a contact form factor. If the identity token 210 is implemented with a contactless form factor, the token interface 208 of the client terminal 200 may comprises a wireless interface that allows the client terminal 200 to communicate with the identity token 210 via a wireless protocol, such as ISO 14443. For example, the identity token 210 may be implemented within a wireless telephone or a wireless data messaging device, and the client terminal 200 may be configured to communicate with the identity token 210 using near-field communication or Bluetooth. If the identity token 210 is implemented with a contact form factor, the token interface 208 may comprise a physical port (e.g. smartcard reader) that allows the client terminal 200 to communicate directly with the identity token 210 without a wireless link.

Figure 4:
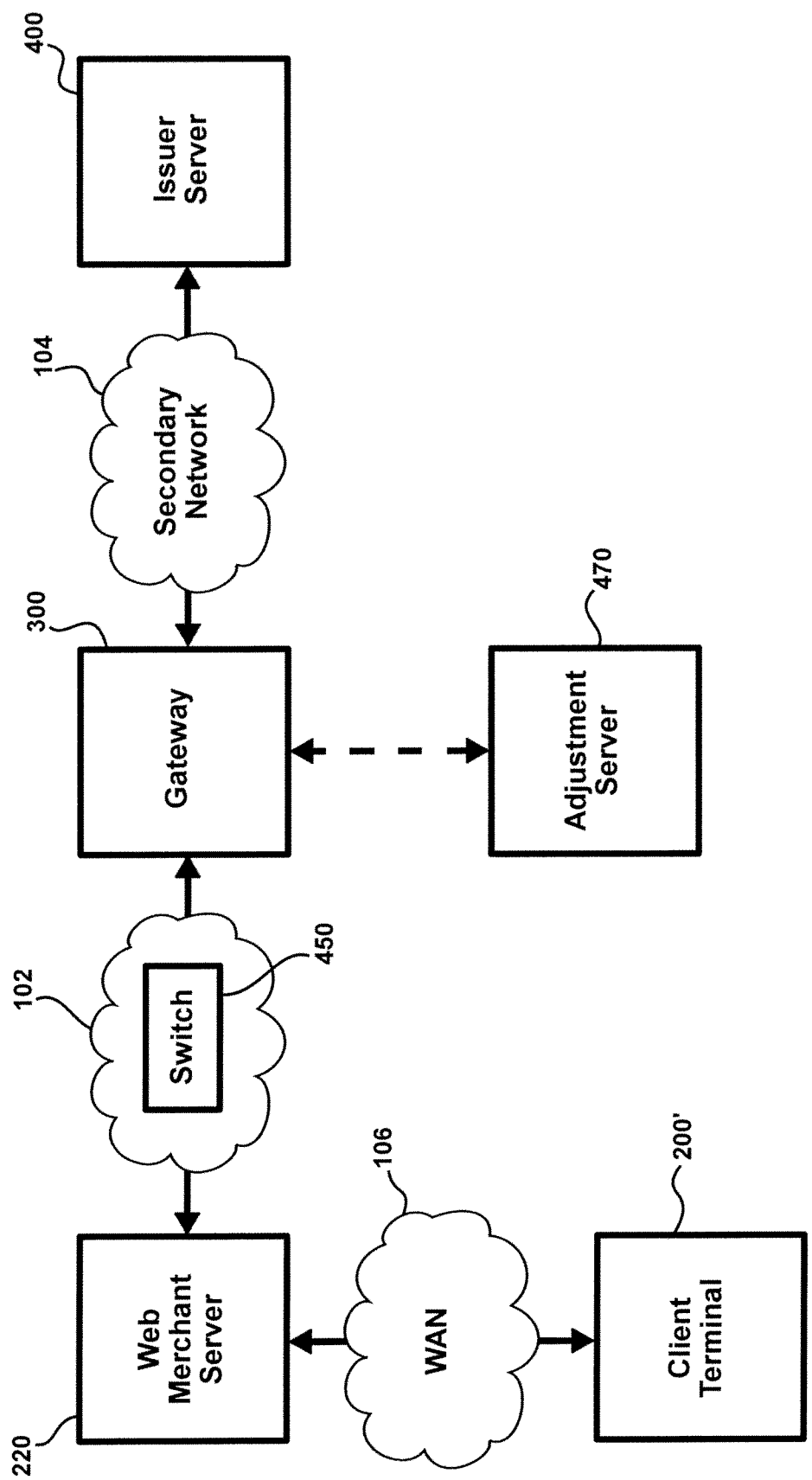
FIG. 4 is a block diagram that illustrates a variation of the online transaction processing network shown in FIG. 1.

Although, as shown in Figure, the client terminal 200 typically comprises a single networked computing device, the functionality of the client terminal 200 may be implemented instead using two or more communication devices. Therefore, in the variation shown in FIG. 4, the online transaction processing network 100 includes a client terminal 200' and a web merchant server 220 which together implement the functionality of the client terminal 200.

The web merchant server 220 may communicate with the network gateway 300 over the primary communications network 102 (optionally via the front-end switch 450) and may communicate with the client terminal 200' via a wide area network 106. The client terminal 200' may be implemented as a personal or tablet computer, or a wireless internet appliance, as examples. The client terminal 200' may include the input device 202, the display device 204 and the computer processing unit 206, and may also include the token interface 208 to allow the client terminal 200' to communicate with the identity token 210. Alternately, instead of the identity token 210 being distinct from the client terminal 200', the functionality of the identity token 210 may be embedded within the client terminal 200' such that the identity token 210 and the client terminal 200' comprise a single communications device.

Network Gateway

Figure 5:
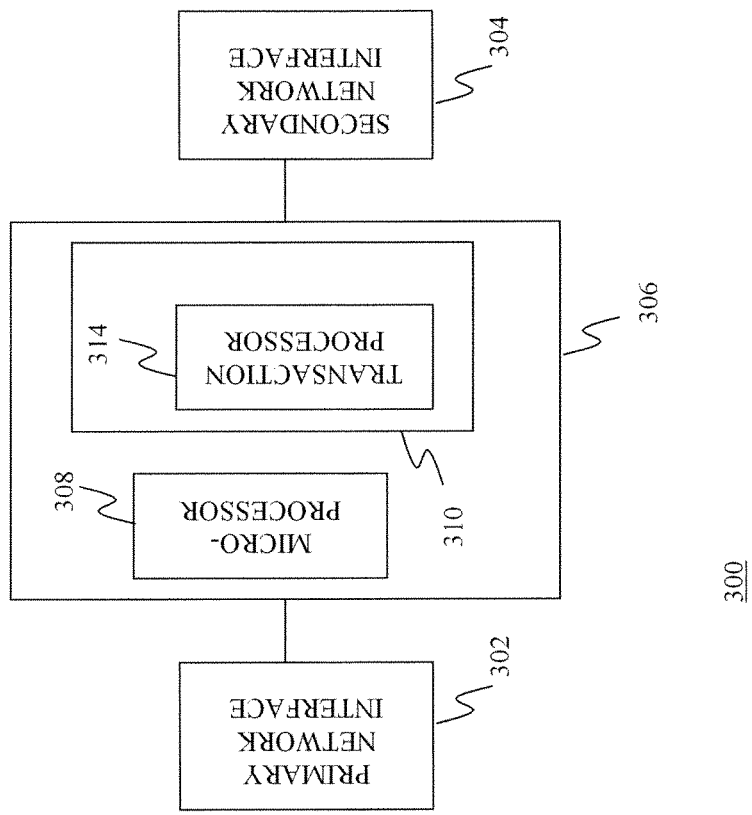
FIG. 5 is a schematic view of the network gateway.

As shown in FIG. 5, each network gateway 300 is implemented as a networked computer server, and includes a primary network interface 302, a secondary network interface 304, and a computer processing unit 306 that is coupled to the primary network interface 302 and the secondary network interface 304. The primary network interface 302 interfaces the network gateway 300 with the primary network 102 and allows the network gateway 300 to communicate with the client terminal(s) 200/200' (e.g. via the front-end switch 450). The secondary network interface 304 interfaces the network gateway 300 with the secondary network 104 and allows the network gateway 300 to communicate with the issuer server(s) 400.

The computer processing unit 306 may include a microprocessor 308 and a computer-readable medium 310. The computer-readable medium 310 may be provided as electronic computer memory (e.g. flash memory) or optical or magnetic memory (e.g. compact disc, hard disk) and may include computer processing instructions stored thereon which, when executed by the microprocessor 308, define an operating system 312 that controls the overall operation of the network gateway 300.

The computer processing instructions may also implement a transaction processor 314 that generates a revised transaction request 520 from a transaction request 500 (an "incoming transaction request") that the network gateway 300 receives from one of the client terminals 200/200' via the primary network 102. As shown in FIG. 6a, preferably the incoming transaction request 500 includes an incoming transaction message 502 and the token cryptogram 504 that was generated by the identity token 210 that was interfaced with the client terminal 200/200'. Typically, the incoming transaction message 502 includes transaction details 506 of the online transaction and the token identification number 508 of the identity token 210. The transaction details 506 comprise particulars of the online transaction, such as payment amount, country code, transaction currency, transaction date, transaction type (e.g. debit, credit, loyalty point redemption), as examples. The token identification number 508 may comprise a payment card number, a credit card number, a loyalty card number, as examples.

As shown in FIG. 6b, the revised transaction request 520 includes a revised transaction message 522 that the network gateway 300 derives from the incoming transaction request 500, and a revised transaction request cryptogram 524 that the network gateway 300 generates from the revised transaction message 522. The revised transaction message 522 includes the token identification number 508, and also includes the transaction details 506 of the incoming transaction message 502 but adjusted based on an adjustment message received from the adjustment server 470 (the "adjusted transaction details" 510). The revised transaction request cryptogram 524 may be generated from additional information (e.g. the token identification number 508) contained in the incoming transaction message 502.

The transaction processor 314 may be configured to generate the revised transaction request 520 after validation of the token identification number 508. The transaction processor 314 may generate the revised transaction request 520 by verifying that the token cryptogram 504 was generated by the identity token 210, and generating the revised transaction request 520 in accordance with an outcome of the verifying.

The transaction processor 314 may be configured to generate the revised transaction request 520 by transmitting a portion of the incoming transaction request 500 (a "transaction adjustment request") to the adjustment server 470, receiving an adjustment message 564 from the adjustment server 470 and generating the revised transaction message 522 from the adjustment message 564 and the incoming transaction request 500. Preferably, the adjustment server 470 generates the adjustment message 564 from at least the token identification number 508. The transaction processor 314 may also be configured to incorporate portions of the incoming transaction message 502 and the adjustment message 564 into the revised transaction authorization message.

Preferably, the revised transaction request cryptogram 524 is uniquely associated with the identity token 210 (even the network gateway 300 generated the revised transaction request cryptogram 524), and the transaction processor 314 is configured to generate the revised transaction request cryptogram 524 from the token cryptographic key(s) that is/are uniquely associated with the identity token 210. The transaction processor 314 may also be configured to generate the token cryptographic key(s) of the identity token 210 from the token identification number 508 (included in the incoming transaction request 500).

The network gateway 300 may also be provided with a master cryptographic key from the operator of the issuer server 400, and the transaction processor 314 may be configured to generate the revised transaction request cryptogram 524 by applying the transaction message, the token identification number 508 and the master cryptographic key as inputs to a suitable cryptographic algorithm. For example, the network gateway 300 may (i) use the token identification number 508 and the master cryptographic key as inputs to a suitable cryptographic algorithm to thereby recover the token cryptographic key(s) of the identity token 210, (ii) compute a one-way hash of the revised transaction message 522, and (iii) generate the revised transaction request cryptogram 524 by encrypting the hash with the recovered token cryptographic key(s).

The transaction processor 314 may also receive a transaction authorization 540 for the revised transaction request 520 from one of the issuer servers 400 via the secondary network 104, and provide a revised transaction authorization 560 to the client terminal 200/200' via the primary network 102 in accordance with the received transaction authorization 540. The revised transaction authorization 560 provides an indication of authorization of the revised transaction request 520. As shown in FIG. 6c, preferably the revised transaction authorization 560 includes a revised transaction authorization message 562, and a revised transaction authorization cryptogram 566. The revised transaction authorization message 562 may comprise portions of the incoming transaction message 502 (e.g. original payment amount, transaction date), and the adjustment message 564 (e.g. discount amount). The transaction processor 314 may be configured to generate the revised transaction authorization cryptogram 566 from the received transaction authorization 540.

Although the transaction processor 314 may be implemented as computer processing instructions, all of a portion of the functionality of the transaction processor 314 may be implemented instead in electronics hardware. As an example, to maintain the integrity of the cryptogram verification and/or generation processes, the network gateway 300 may include an internally- or externally-connected hardware security module (HSM) which the transaction processor 314 uses to verify the token cryptogram 504, and/or to recover/generate the token cryptographic key(s), the revised transaction request cryptogram 524 and/or the revised transaction authorization cryptogram 566. As is known in the art, the HSM is a physical hardware device that includes a secure crypto-processor that is used to manage cryptographic keys and implement the cryptographic algorithms.

Issuer Server

As shown in FIG. 1, each issuer server 400 is implemented as a networked computer server, and is configured to receive a revised transaction request 520 from one of the network gateways 300, and to validate the revised transaction request 520 from the revised transaction request cryptogram 524 (included in the revised transaction request 520). As will be discussed below, the issuer server 400 may be configured to validate the revised transaction request 520 by verifying that the revised transaction request cryptogram 524 was generated by the identity token 210 that was interfaced with the network client 200/200' (even though the revised transaction request cryptogram 524 may have actually been generated by the network gateway 300).

As discussed above, the network gateway 300 may have generated the revised transaction request cryptogram 524 from the unique token cryptographic key(s) assigned to the identity token 210. Further, the operator of the issuer server 400 may have authorized the distribution of certain identity tokens 210 to intended recipients, and may have generated the unique token cryptographic key(s) for each of the distributed identity tokens 210 using the token identification number 508 thereof and a master private cryptographic key as inputs to a suitable cryptographic algorithm. Accordingly, the issuer server 400 may validate the revised transaction request 520 by applying the token identification number 508 (included in the revised transaction message 522), the master private cryptographic key of the issuer server 400, and the revised transaction request 520 as inputs to a suitable cryptographic algorithm. For example, the issuer server 400 may validate the revised transaction request 520 by (i) re-generating the token cryptographic key(s) assigned to the identity token 210 using the token identification number 508 and the master private cryptographic key of the issuer server 400 as inputs to a suitable cryptographic algorithm, (ii) decrypting the revised transaction request cryptogram 524 with the re-generated token cryptographic key(s), (iii) computing a one-way hash of the revised transaction message 522, and (iv) comparing the computed hash against the decrypted cryptogram.

Alternately, instead of using a cryptographic algorithm to generate/re-generate the token cryptographic key(s), the issuer server 400 may be interfaced with a local database of token records. Each database record may be uniquely associated with a respective identity token 210, and include the token identification number 508 of the respective identity token 210 and the unique token cryptographic key(s) assigned to the identity token 210. Therefore, in this variation, the issuer server 400 may validate the revised transaction request 520 by querying the local token database with the token identification number 508 (included in the revised transaction message 522) for the token cryptographic key(s) of the associated identity token 210, and using the located token cryptographic key(s) to validate the revised transaction request cryptogram 524, as discussed above.

Front-End Switch

As discussed, the transaction processing network 100 may include a plurality of the network gateway(s) 300. In this variation, each network gateway 300 may be uniquely associated with a range of token identification number 508, and may be configured to only process incoming transaction requests 500 in which the token identification number 508 thereof is within the respective unique range. Therefore, instead of each network gateway 300 receiving all incoming transaction requests 500 from the client terminals 200/200', the front-end switch 450 may receive all the incoming transaction requests 500 from the client terminals 200/200' via the primary network 102, and may be configured to use the token identification number 508 of each incoming transaction request 500 to re-direct the incoming transaction request 500 to the appropriate network gateway 300.

Adjustment Server

As shown in FIG. 1, the adjustment server 470 may implemented as a networked computer server, and is configured to generate an adjustment message 564 from a transaction adjustment request that the adjustment server 470 receives from the network gateway 300. The adjustment server 470 may be in communication with a database 480 of adjustment data and a database 490 of token data, and configured to generate the adjustment message 564 by querying the adjustment database 480 and the token database 490 with information included in the transaction adjustment request.

Each record of the adjustment database 480 specifies one or more adjustment factors 482 and one or more associated evaluation conditions 484 that the adjustment server 470 may use to generate the adjustment message 564. Each adjustment factor 482 and associated evaluation condition(s) 484 comprises an offer, provided by a merchant or an issuer of an identity token 210, to adjust the terms of an online transaction, and specifies an adjustment value (absolute or relative) to be applied to the transaction details 506 of the transaction request 500. Each evaluation condition 484 specifies a condition that must be met for the associated adjustment value(s) to be applicable. The operator of any of the client terminals 200, the web merchant server 220, the network gateway 300 and/or the issuer server 450 may upload adjustment factors 482 and associated evaluation conditions 484 to the adjustment database 480 at any time.

As an example, the adjustment database 480 may include the following records:

Sample Adjustment Database

| Record No. | Adjustment Factor | Evaluation Condition(s) |
|---|---|---|
| 1 | decrease payment amount 10% | 01 Oct >= transaction date >= 30 Nov |
| 2 | award 10 loyalty points | Payment Amount >$100 |
| 3 | decrease payment amount 5% award 30% loyalty points | 01 Oct >= transaction date >= 31 Oct payment amount >$100 Vendor ID = ABC |
| 4 | redeem loyalty points = 150% of payment amount decrease payment amount 30% | Payment Amount >$200 01 Oct >= transaction date >= 31 Oct |

As specified in Record No. 1 of the Sample Adjustment Database, all transactions between October $1^{st}$ and November $30^{th}$ are eligible for a 10% discount to the payment amount. As specified in Record No. 2, all transactions between October $1^{st}$ and November $30^{th}$ that have a monetary value greater than $100 are eligible for a reward of 10 loyalty points. As specified in Record No. 3, all transactions with the vendor whose Vendor ID=ABC and that have a monetary value greater than $200 are eligible for 5% discount to the payment amount and a loyalty points reward of 30% of the payment amount. As specified in Record No. 4, all transactions between October $1^{st}$ and November $30^{th}$ that have a monetary value greater than $200 may be completed by redeeming loyalty points valued at 1.5× the payment amount and providing monetary payment in the amount of 70% of the payment amount.

Each record of the token database 490 may be uniquely associated with a respective identity token 210, and may include a user profile 492 and the token identification number 508 of the respective identity token 210 (or a one-way hash of the token identification number 508). Each user profile 492 may include user preference data that identifies one or more preferred adjustment criteria that the adjustment server 470 may use to select generate the adjustment message 564. Each user may rank the adjustment criteria if the user profile 492 includes multiple adjustment criteria. Each user may upload the user profile 492 to the adjustment server 470 prior to the date of first use of the user's identity token 210 and/or at any time subsequent thereto. Alternately, or additionally, the user profile 492 may include a user digest that is complied from various statistical information associated with the user, including, but not limited to, the user's age, sex, location, and purchasing history and preferences.

As an example, the token database 490 may include the following records:

Sample Token Database

| Record ID. | Token Identification Number Hash | Preference Profile |
|---|---|---|
| A | hash (1234567) | 1. max (payment amount discount) 2. max (loyalty/reward points) |
| B | hash (7654321) | 1. max (loyalty/reward points) 2. max (payment amount discount) |
| C | hash (1234321) | max (payment amount discount, loyalty/reward points) |

As specified in Record A of the Sample Token Database, the user of the identity token 210 having token identification number 508=1234567 prefers an adjustment factor that provides the maximum discount to the payment amount, followed by an adjustment factor that provides the maximum loyalty/reward points if no payment amount discount is available. As specified in Record B, the user of the identity token 210 having identification number 508=7654321 prefers an adjustment factor that provides the maximum loyalty/reward points, followed by an adjustment factor that provides the maximum payment amount discount if no loyalty/reward points are available. As specified in Record C, the user of the identity token 210 having identification number 508=1234321 prefers an adjustment factor that provides the maximum total monetary value for the payment amount discount and reward of loyalty/reward points.

The adjustment server 470 may generate the adjustment message 564 by querying the token data database 490 with the token identification number 508 (or the token identification number hash) to locate the associated user profile 492, querying the evaluation condition(s) 484 with information contained in the transaction adjustment request to locate one or more available adjustment factors 482, and generating the adjustment message 564 by evaluating the located adjustment factor(s) 482 using the located user profile 492.

Therefore, continuing the example of the Sample Adjustment Database and the Sample Token Database, if the transaction adjustment request includes the following data:
  hash (token identification number 508)=1234567
  payment amount=$150
  transaction date=3 October
  Vendor ID=XYZ
the adjustment server 470 would determine from the Sample Adjustment Database that the online transaction was eligible for the following adjustment factors:
  1. discount to payment amount: $15
  2. loyalty points reward: 10

The adjustment server 470 would also determine from the Sample Token Database that the user preferred adjustment factors that provided the maximum discount to the payment amount. Therefore, in this example, the adjustment server 470 would generate an adjustment message 564 stating that a payment amount reduction in the amount of $15 was available for the online transaction.

If the transaction adjustment request includes the following data:
  hash (token identification number 508)=7654321
  payment amount=$250
  transaction date=3 October
  Vendor ID=ABC
the adjustment server 470 would determine that the online transaction was eligible for the following adjustment factors:
  1. discount to payment amount: $25
  2. loyalty points reward: 10
  3. discount to payment amount: $12.50; loyalty points reward: 75
  4. discount to payment amount: $75, after redeeming 375 loyalty points The adjustment server 470 would also determine that the user preferred adjustment factors that provided the maximum loyalty/reward points. Therefore, in this example, the adjustment server 470 would generate an adjustment message 564 stating that a payment amount reduction in the amount of $12.50 and an award of 75 loyalty points were both available for the online transaction.

Figure 7:
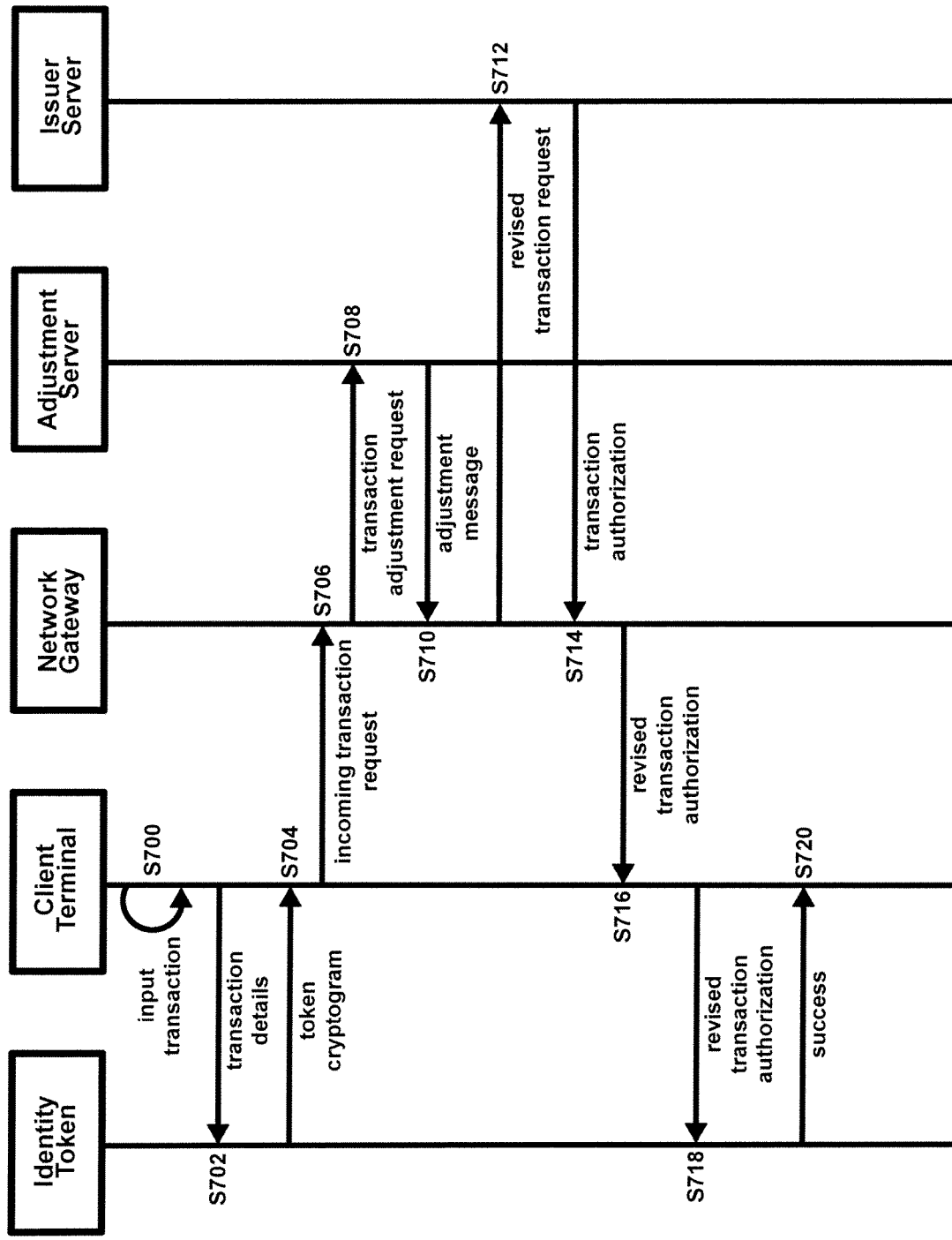
FIG. 7 is a message flow diagram that depicts the transmission of messages during a sample implementation of the transaction request processing method.

Transaction Request Processing—Detailed Discussion
1. Generate Incoming Transaction Request The online transaction processing network 100 uses the network gateway 300 and the issuer server 400 (and optionally the front-end switch 450 and the adjustment server 470) to process an online transaction request that is transmitted from one of the client terminals 200/200'. A sample embodiment of the transaction request processing method will now be described in detail with reference to the message flow diagram depicted in FIG. 7.

To complete an online transaction, the user attends at one of the client terminals 200/200'. Each client terminal 200 typically is deployed at the premises of a merchant, whereas each client terminal 200' typically is deployed remotely from the merchant's premises. In the event that the user attends on-site at one of the client terminals 200, at step S700 the merchant enters particulars (e.g. payment amount, transaction date, transaction type (e.g. credit, debit)) of the online transaction into the client terminal 200. Otherwise, in the event that the user attends at one of the client terminals 200', at step S700 the web merchant server 220 transmits the transaction particulars to the client terminal 200' via the wide area network 106.

Upon receipt of the transaction particulars, the client terminal 200 may prompt the user to input a personal identification number (PIN) into the input device 202, and may transmit the PIN to the identity token 210 for offline user authentication. As discussed above, the identity token 210 may be implemented within the client terminal 200' or may be distinct from the client terminal 200/200'. The identity token 210 may then authenticate the user by comparing the received PIN against the PIN stored in the protected memory of the identity token 210, and respond to the client terminal 200 with a user authentication message (e.g. card verification results) based on the outcome of the PIN comparison.

If the user is successfully authenticated (if required), at step S702 the client terminal 200/200' transmits to the identity token 210 transaction details 506 that may comprise all or a portion of the transaction particulars. Preferably, the transaction details 506 includes the payment amount, the transaction date, the transaction type, and optionally may also include other EMV (Europay-Mastercard-Visa) verification data, such as, but not limited to, one or more of a client terminal country code, a transaction currency code, a transaction counter, and the card verification results. The transaction details 506 may also include a pseudo-random number that is dynamically generated by the client terminal 200/200'.

Upon receipt of the transaction details 506 at the identity token 210, the identity token 210 generates a token cryptogram 504 using the transaction details 506 and the token cryptographic key(s) as inputs to a suitable cryptographic algorithm. For example, the identity token 210 may generate the token cryptogram 504 by computing a one-way hash of the transaction details 506, and encrypting the result with the token cryptographic key(s). Preferably, the identity token 210 uses an EMV standard cryptographic algorithm and associated cryptographic keys to generate the token cryptogram 504. At step S704, the identity token 210 transmits the token cryptogram 504 to the client terminal 200/200', together with the identification number 508 that was assigned to the identity token 210.

Upon receipt of the token cryptogram 504 and the identification number 508 at the client terminal 200, the client terminal 200 generates an incoming transaction request 500 that includes an incoming transaction message 502 and the token cryptogram 504. Preferably, the incoming transaction message 502 includes the transaction details 506 and the token identification number 508. At step S706, the client terminal 200 transmits the incoming transaction request 500 to the network gateway 300 via the primary network 102. Alternately, the client terminal 200 may transmit the incoming transaction request 500 to the front-end switch 450. From the identification number 508, the front-end switch 450 may determine the correct network gateway 300 for the incoming transaction request 500, and re-direct the incoming transaction request 500 to the correct network gateway 300.

In the variation where the identity token 210 transmits the token cryptogram 504 and the identification number 508 to the client terminal 200', the client terminal 200' may generate the incoming transaction request 500 from the received information, as described above, and may forward the incoming transaction request 500 to the web merchant server 220. Alternately, the client terminal 200' may simply forward the token cryptogram 504, the transaction details 506 and the identification number 508 to the web merchant server 220, and the web merchant server 220 may generate the incoming transaction request 500 from the received information. In either case, at step S706 the web merchant server 220 transmits the incoming transaction request 500 to the network gateway 300 via the primary network 102 (and optionally the front-end switch 450).

2. Generate Revised Transaction Request from Incoming Transaction Request

After receipt of the incoming transaction request 500 at the network gateway 300, the network gateway 300 generates a revised transaction request 520 from the incoming transaction request 500, adjusted based on the offers that are available for the online transaction. At the outset of generating the revised transaction request 520, the network gateway 300 may first validate the identification number 508. To validate the identification number 508, the network gateway 300 may determine whether the identification number 508 falls within a range of valid identification numbers. If the identification number 508 is not valid, the network gateway 300 may terminate the revised transaction request generating process and issue a suitable error message to the client terminal 200/200' (and/or the merchant terminal 220). Otherwise, the network gateway 300 may then verify that the token cryptogram 504 was generated by the identity token 210.

To verify that the token cryptogram 504 was generated by the identity token 210, the network gateway 300 may use the incoming transaction request 500, the token identification number 508, and the master cryptographic key that was provided by the operator of the issuer server 400 as inputs to a suitable cryptographic algorithm. For example, the network gateway 300 may use the token identification number 508 and the master cryptographic key as inputs to a suitable cryptographic algorithm to thereby recover the token cryptographic key(s) of the identity token 210. The network gateway 300 may then decrypt the token cryptogram 504 with the re-generated token cryptographic key(s), and compute a one-way hash of the incoming transaction message 502. If the computed hash does not match the decrypted cryptogram, the network gateway 300 will have confirmed that the token cryptogram 504 was not generated by the identity token 210. The network gateway 300 may then terminate the revised transaction request generating process and issue a suitable error message to the client terminal 200/200' (and/or the merchant terminal 220). Otherwise, the network gateway 300 may then proceed to modify a portion of the transaction details 506.

To generate the adjusted transaction details 510 from the transaction details 506, at step S708 the network gateway 300 may generate a transaction adjustment request from the transaction details 506, and transmit the transaction adjustment request to the adjustment server 470. Preferably, the transaction adjustment request includes the transaction details 506 that are required by the adjustment server 470 to determine the offers that are available for the online transaction. The transaction adjustment request may include, for example, the payment amount, and one or more of the token identification number 508 (or a hash of the token identification number 508), the vendor location and the Vendor ID.

Upon receipt of the transaction adjustment request at the adjustment server 470, the adjustment server 470 generates the adjustment message 564 from one or more data elements included in the transaction adjustment request. For example, the adjustment server 470 may query the token data database 490 with the token identification number 508 (or the token identification number hash) to locate the associated user profile 492. The adjustment server 470 may also query the evaluation condition(s) 484 of the adjustment database 480 with the other information contained in the transaction adjustment request (such as the vendor location and/or Vendor ID) to locate the adjustment factors 482 that are available for the online transaction. At step S710, the adjustment server 470 generates the adjustment message 564 by evaluating the located adjustment factor(s) 482 using the located user profile 492, and transmits the adjustment message 564 to the network gateway 300.

As discussed above, the user profile 492 may include one or more preferred adjustment criteria that the user uploaded to the adjustment server 470, in which case the adjustment message 564 may be generated based on the adjustment criteria associated with the token identification number 508. Alternately, the user profile 492 may include a user digest compiled from various statistical information of the user, in which case the adjustment message 564 may be generated based on the located statistical information. Alternately or additionally, the adjustment message 564 may be generated based on other data elements included in the transaction adjustment request, such as the vendor location and/or Vendor ID.

The network gateway 300 then generates the revised transaction request 520 from the incoming transaction request 500 and from the adjustment message 564 that it receives from the adjustment server 470. To do so, the network gateway 300 generates a revised transaction message 522 that includes the revised transaction details 510 (comprising the transaction details 506 of the incoming transaction message 502, but adjusted based on the received adjustment message 564). Continuing the above example where the adjustment message 564 states that a payment amount reduction in the amount of $15 is available for the online transaction, the network gateway 300 would generate a revised transaction message 522 in which the amount in the Payment Amount field is reduced $135 (from $150).

However, typically the issuer server 400 does not process revised transaction requests 520 that award or redeem loyalty points. Therefore, where the adjustment message 564 includes an award/redemption of loyalty points, the network gateway 300 would generate a revised transaction message 522 that includes the (adjusted) payment amount (if any), and would process the loyalty point award/redemption separately of the revised transaction message 522. Continuing the above example where the adjustment message 564 states that a payment amount reduction of $12.50 and a reward of 75 loyalty points are available for the online transaction, the network gateway 300 would process the loyalty point award/redemption by creating in the loyalty/rewards account that is associated with the token identification number 508 a debit/credit entry in the amount of the loyalty point award/redemption that was specified in the adjustment message 564. If the processing of the loyalty point award/redemption was successful (e.g. the online account associated with the identification number 508 had sufficient loyalty points to process the loyalty point redemption), the network gateway 300 would generate a revised transaction message 522 in which the amount in the Payment Amount field is reduced to $227.50 (from $250). If the adjustment message 564 states that the online transaction can be completed entirely by redeeming loyalty points (i.e. no payment amount required), the network gateway 300 need not generate a revised transaction request 520 but could, instead, commence generating a revised transaction authorization 560 from a transaction authorization 540, at step S714.

Since the identity token 210 generated the token cryptogram 504 from the transaction details 506 that it received from the client terminal 200, the token cryptogram 504 will not correspond to the adjusted transaction details 510 of the revised transaction message 522. To allow the issuer server 400 to validate the revised transaction message 522 of the revised transaction request 520, the network gateway 300 also generates a revised transaction request cryptogram 524 from the revised transaction message 522 and from the token cryptographic key(s) that is/are uniquely associated with the identity token 210. The network gateway 300 may generate the revised transaction request cryptogram 524 using the revised transaction message 522, the token identification number 508 and the network gateway's master cryptographic key (provided by the operator of the issuer server 400) as inputs to a suitable cryptographic algorithm.

For example, to generate the revised transaction request cryptogram 524 the network gateway 300 may (i) use the token identification number 508 and the network gateway's master cryptographic key as inputs to a suitable cryptographic algorithm to recover the token cryptographic key(s) of the identity token 210, (ii) compute a hash of the revised transaction message 522, and (iii) generate the revised transaction request cryptogram 524 by encrypting the hash with the recovered token cryptographic key(s). Since the revised transaction request cryptogram 524 is generated from the token cryptographic key(s) of the identity token 210, the revised transaction request cryptogram 524 is uniquely associated with the identity token 210.

At step S712, the network gateway 300 assembles the revised transaction request 520 from the revised transaction message 522 and the revised transaction request cryptogram 524, and transmits the revised transaction request 520 to the appropriate issuer server 400 via the secondary network 104.

3. Generate Transaction Authorization from Revised Transaction Request

Upon receipt of the revised transaction request 520 at the issuer server 400, the issuer server 400 determines the validity of the revised transaction request 520, and generates a transaction authorization 540 in accordance with an outcome of the revised transaction request validation.

At the outset of determining the validity of the revised transaction request 520, the issuer server 400 may first verify that the revised transaction request 520 was generated by the identity token 210 that was interfaced with the network client 200/200'. To do so, the issuer server 400 may use the revised transaction request 520 and the master private cryptographic key of the issuer server 400 as inputs to a suitable cryptographic algorithm. For example, the issuer server 400 may verify the revised transaction request 520 by re-generating the token cryptographic key(s) that is/are assigned to the identity token 210 using the token identification number 508 (included in the revised transaction message 522) and the master private cryptographic key of the issuer server 400 as inputs to a suitable cryptographic algorithm. Alternately, the issuer server 400 may query its local token database with the token identification number 508 to locate the token cryptographic key(s) of the associated identity token 210. The issuer server 400 may then decrypt the revised transaction request cryptogram 524 with the re-generated/located token cryptographic key(s), compute a hash of the revised transaction message 522, and compare the computed hash against the decrypted cryptogram.

If the computed hash matches the decrypted cryptogram, the issuer server 400 has verified, in effect, that the revised transaction request cryptogram 524 was generated by the identity token 210 from the revised transaction message 522 (even though the revised transaction request cryptogram 524 was actually generated by the network gateway 300). The issuer server 400 then continues to determine the validity of the revised transaction request 520 by applying its prevailing risk management rules to the adjusted transaction details 510, as specified in the revised transaction message 522. Therefore, for example, pursuant to the applicable risk management rules the issuer server 400 may determine whether the online account that is associated with the token identification number 508 is still active and has sufficient credit/funds to complete the transaction (e.g. the adjusted payment amount is less than the credit/funds balance for the account; the number of loyalty points being redeemed is less than the loyalty point balance). Pursuant to the applicable risk management rules, the issuer server 400 may also determine from the country code and/or the size of the adjusted payment amount whether the online transaction is consistent with the user's history of online transactions.

After the issuer server 400 finishes determining the validity of the revised transaction request 520, the issuer server 400 generates a transaction authorization 540 indicating the outcome of the revised transaction request validation. The transaction authorization 540 includes a transaction authorization message, and a transaction authorization cryptogram that the issuer server 400 generates from the transaction authorization message. Preferably, the transaction authorization message includes a transaction authorization response code, the token identification number 508 and portions of the adjusted transaction details 510 (e.g. adjusted payment amount, transaction date) that were specified in the revised transaction message 522.

The transaction authorization response code indicates the outcome of the revised transaction request validation. For example, if the issuer server 400 determines that the revised transaction request cryptogram 524 was not generated by the identity token 210 from the revised transaction message 522, the issuer server 400 may insert into the transaction authorization message a transaction authorization response code indicating that cryptographic validation of the revised transaction request cryptogram 524 failed or that the token identification number 508 was invalid.

On the other hand, if the issuer server 400 determines that the revised transaction request cryptogram 524 was generated by the identity token 210 from the revised transaction message 522, but the issuer server 400 determines that the token identification number 508 has expired or that the account associated with the token identification number 508 has insufficient credit/funds to complete the transaction, the issuer server 400 may insert a corresponding transaction authorization response code into the transaction authorization message. Otherwise, the issuer server 400 processes the revised transaction request 520 by creating in the online account that is associated with the token identification number 508 a debit/credit entry in the amount of the adjusted payment amount that was specified in the revised transaction request 520. The issuer server 400 may then incorporate into the transaction authorization message a transaction authorization response code indicating that the online transaction was approved.

The issuer server 400 may generate the transaction authorization cryptogram from the transaction authorization message and the revised transaction request cryptogram 524. To do so, the issuer server 400 may apply the transaction authorization message, the token identification number 508, the revised transaction request cryptogram 524 and a private cryptographic key of the issuer server 400 as inputs to a suitable encryption algorithm. For example, the issuer server 400 may use the token identification number 508 and the private cryptographic key as inputs to a suitable cryptographic algorithm to thereby recover the token cryptographic key(s) of the identity token 210. Alternately, the issuer server 400 may query its local token database with the token identification number 508 to locate the token cryptographic key(s) of the associated identity token 210. The issuer server 400 may then compute a one-way hash of the transaction authorization message and the revised transaction request cryptogram 524, and generate the transaction authorization cryptogram by encrypting the hash with the recovered/located token cryptographic key(s).

At step S714, the issuer server 400 incorporates the transaction authorization message and the transaction authorization cryptogram into the transaction authorization 540, and transmits the transaction authorization 540 to the network gateway 300 via the secondary network 104.

4. Generate Revised Transaction Authorization from Transaction Authorization

Upon receipt of the transaction authorization 540 at the network gateway 300, the network gateway 300 generates a revised transaction authorization 560 from the received transaction authorization 540.

At the outset of generating the revised transaction authorization 560, the network gateway 300 may first validate the transaction authorization 540. To validate the transaction authorization 540, the network gateway 300 may first verify that the transaction authorization message was generated by the issuer server 400. To do so, the network gateway 300 may use the transaction authorization message and the master private cryptographic key of the issuer server 400 as inputs to a suitable cryptographic algorithm. For example, the network gateway 300 may verify the transaction authorization message by re-generating the token cryptographic key(s) that is/are assigned to the identity token 210 using the token identification number 508 (included in the transaction authorization message) and the master private cryptographic key of the issuer server 400 as inputs to a suitable cryptographic algorithm. The network gateway 300 may then decrypt the transaction authorization cryptogram with the re-generated token cryptographic key(s), compute a hash of the transaction authorization message, and compare the computed hash against the decrypted cryptogram.

If the computed hash does not match the decrypted cryptogram, the network gateway 300 may terminate the transaction authorization message verifying process and issue a suitable error message to the client terminal 200/200'

(and/or the merchant terminal 220). However, if the computed hash matches the decrypted cryptogram, the network gateway 300 has verified the transaction authorization 540 and, therefore, the network gateway 300 generates the revised transaction authorization 560 from the received transaction authorization 540. The revised transaction authorization 560 includes a revised transaction authorization message 562 and a revised transaction authorization cryptogram 566.

The revised transaction authorization 560 provides an indication of the authorization of the revised transaction request 520. Accordingly, the revised transaction authorization message 562 may include the token identification number 508 and the transaction authorization response code from the transaction authorization 540. Preferably, the revised transaction authorization message 562 also includes portions of the incoming transaction message 502 (e.g. original payment amount, transaction date), and the adjustment message 564. Accordingly, where the adjustment message 564 states that a discount in the payment amount was available for the online transaction, the revised transaction authorization message 562 may include a "Payment Amount" field that includes the payment amount that was specified in the Incoming Transaction Request 500, and a "Payment (Discount)" field that includes the discount amount. Where the adjustment message 564 includes an award/redemption of loyalty points, the revised transaction authorization message 562 may include a "Rewards" field that includes the loyalty point award/redemption that was specified in the adjustment message 564.

To allow the identity token 210 to validate the revised transaction authorization 560, the network gateway 300 generates the revised transaction request cryptogram 524 using the token cryptogram 504, the token identification number 508, the revised transaction authorization message 562, and the network gateway's master cryptographic key as inputs to a suitable cryptographic algorithm. For example, the network gateway 300 may generate the revised transaction request cryptogram 524 by re-generating the token cryptographic key(s) that is/are assigned to the identity token 210 using the token identification number 508 and the master private cryptographic key of the issuer server 400 as inputs to a suitable cryptographic algorithm. The network gateway 300 may then compute a one-way hash of the token cryptogram 504 and the revised transaction authorization message 562, and encrypt the result with the re-generated token cryptographic key(s).

At step S716, the network gateway 300 incorporates the revised transaction authorization message 562 and the revised transaction request cryptogram 524 into the revised transaction authorization 560, and transmits the revised transaction authorization 560 to the client terminal 200/200' via the primary network 102.

5. Validate Revised Transaction Authorization

Upon receipt of the revised transaction authorization 560 at the client terminal 200/200', at step S718 the client terminal 200/200' transmits the revised transaction authorization 560 to the identity token 210.

Upon receipt of the revised transaction authorization 560 at the identity token 210, the identity token 210 validates the revised transaction authorization 560 using the revised transaction authorization 560 and the token cryptographic key(s) as inputs to a suitable cryptographic algorithm. For example, the identity token 210 may decrypt the revised transaction request cryptogram 524 with the token cryptographic key(s), compute a hash of the revised transaction authorization message 562, and compare the computed hash against the decrypted cryptogram.

If the computed hash does not match the decrypted cryptogram, the identity token 210 may issue a suitable error message to the client terminal 200/200' (and/or the merchant terminal 220). However, if the computed hash matches the decrypted cryptogram, the identity token 210 has verified, in effect, that the revised transaction authorization 560 was generated by the issuer server 400 (even though the revised transaction request authorization 560 was actually generated by the network gateway 300) and, therefore, the identity token 210 issues a successful completion message to the client terminal 200/200' (and/or the merchant terminal 220), at step S720. The client terminal 200 or merchant terminal 220 may display to the user a message that summarizes portions of the revised transaction authorization 560 (e.g. original payment amount, adjusted payment amount, loyalty points redemption/reward, transaction date).

The invention claimed is:

1. A method of processing an online transaction request comprising:

a network gateway receiving an incoming transaction request transmitted from a client terminal, the incoming transaction request including an original payment amount and a token cryptogram and identifying an identity token;

the network gateway confirming that the token cryptogram was generated from the original payment amount and from a token cryptographic key uniquely associated with the identity token;

the network gateway generating a revised transaction message, the revised transaction message including an adjusted payment amount different from the original payment amount;

the network gateway generating a revised transaction request cryptogram from the adjusted payment amount and from the token cryptographic key;

the network gateway generating a revised transaction request, the revised transaction request including the revised transaction message and the revised transaction request cryptogram;

the network gateway transmitting the revised transaction request to an issuer sever, and receiving a transaction authorization from the issuer server in response to the revised transaction request, the transaction authorization including a confirmation that the revised transaction request cryptogram was generated from the adjusted payment amount and the token cryptographic key; and the network gateway generating a revised transaction authorization message from the received transaction authorization, and providing the revised transaction authorization message to the client terminal, the revised transaction authorization message including a confirmation of approval of the revised transaction request.

2. The method according to claim 1, wherein the incoming transaction request includes an identification number identifying the identity token, and the generating a revised transaction message comprises the network gateway transmitting a portion of the incoming transaction request to a computer server, receiving an adjustment message from the computer server and generating the adjusted payment amount from the adjustment message and the incoming transaction request, the computer server generating the adjustment message from at least the identification number.

3. The method according to claim 2, wherein the incoming transaction request includes an incoming transaction message, and the revised transaction authorization message includes the incoming transaction message and the adjustment message.

4. The method according to claim 1, wherein the incoming transaction request includes an identification number identifying the identity token, the revised transaction message includes the identification number, and the generating a revised transaction request cryptogram comprises the network gateway generating the token cryptographic key from the identification number.

5. The method according to claim 4, wherein the generating a revised transaction request cryptogram further comprises the network gateway generating the revised transaction request cryptogram from the incoming transaction request.

6. The method according to claim 1, wherein the revised transaction authorization message includes a revised transaction authorization cryptogram, and the generating a revised transaction authorization message comprises the network gateway generating the revised transaction authorization cryptogram from the token cryptogram and the received transaction authorization.

7. The method according to claim 1, wherein the revised transaction message includes an account identification number identifying the identity token, and the receiving a transaction authorization comprises the issuer server receiving the revised transaction request from the network gateway, recovering the token cryptographic key from the account identification number, confirming that the revised transaction request cryptogram was generated from the recovered token cryptographic key, validating the revised transaction request from the revised transaction request cryptogram, and generating the transaction authorization from the adjusted payment amount and the revised transaction request cryptogram.

8. The method according to claim 1, further comprising the client terminal determining from the revised transaction authorization message whether the issuer server authorized the revised transaction request.

9. The method according to claim 1, wherein the receiving an incoming transaction request comprises a front-end switch receiving the incoming transaction request from the client terminal and directing the incoming transaction request to the network gateway in accordance with a data field of the incoming transaction request.

10. A tangible non-transient computer-readable medium comprising computer processing instructions stored thereon, the computer processing instructions, when executed by a computer, cause the computer to perform a sequence of steps comprising:
receiving an incoming transaction request transmitted from a client terminal, the incoming transaction request including an original payment amount and a token cryptogram and identifying an identity token;
confirming that the token cryptogram was generated from the original payment amount and from a token cryptographic key uniquely associated with the identity token;
generating a revised transaction message, the revised transaction message including an adjusted payment amount different from the original payment amount;
generating a revised transaction request cryptogram from the adjusted payment amount and from the token cryptographic key;
generating a revised transaction request, the revised transaction request including the revised transaction message and the revised transaction request cryptogram;
transmitting the revised transaction request to an issuer sever, and receiving a transaction authorization from the issuer server in response to the revised transaction request, the transaction authorization including a confirmation that the revised transaction request cryptogram was generated from the adjusted payment amount and the token cryptographic key; and
generating a revised transaction authorization message from the received transaction authorization, and providing the revised transaction authorization message to the client terminal, the revised transaction authorization message including a confirmation of approval of the revised transaction request.

11. A network gateway comprising:
a primary network interface for interfacing the network gateway with a primary network;
a secondary network interface for interfacing the network gateway with a secondary network; and
a transaction processor and non-transitory computer-readable media, the transaction processor being coupled to the primary and secondary network interfaces, and the non-transitory computer-readable media storing instructions that, when executed by the transaction processor, cause the transaction processor to:
receive an incoming transaction request from a client terminal via the primary network, the incoming transaction request including an original payment amount and a token cryptogram and identifying an identity token;
confirm that the token cryptogram was generated from the original payment amount and from a token cryptographic key uniquely associated with the identity token;
generate a revised transaction message, the revised transaction message including an adjusted payment amount different from the original payment amount;
generate a revised transaction request cryptogram from the adjusted payment amount and from the token cryptographic key;
generate a revised transaction request, the revised transaction request including the revised transaction message and the revised transaction request cryptogram;
transmit the revised transaction request to an issuer sever via the secondary network, and receive a transaction authorization in response to the revised transaction request from the issuer server via the secondary network, the transaction authorization including a confirmation that the revised transaction request cryptogram was generated from the adjusted payment amount and the token cryptographic key; and
generate a revised transaction authorization message from the received transaction authorization, and provide the revised transaction authorization message to the client terminal via the primary network, the revised transaction authorization message including a confirmation of approval of the revised transaction request.

12. The network gateway according to claim 11, wherein the incoming transaction request includes an identification number identifying the identity token, and the network gateway is configured to generate the revised transaction message by transmitting a portion of the incoming transaction request to a computer server, receiving an adjustment message from the computer server and generating the adjusted payment amount from the adjustment message and the incoming transaction request, the computer server generating the adjustment message from at least the identification number.

13. The network gateway according to claim 12, wherein the incoming transaction request includes an incoming transaction message, and the revised transaction authorization message includes the incoming transaction message and the adjustment message.

14. The network gateway according to claim 11, wherein the incoming transaction request includes an identification number identifying the identity token, the revised transaction message includes the identification number, and the network gateway is configured to generate the token cryptographic key from the identification number.

15. The network gateway according to claim 14, wherein the network gateway is configured to generate the revised transaction request cryptogram further from the incoming transaction request.

16. The network gateway according to claim 11, wherein the revised transaction authorization message includes a revised transaction authorization cryptogram, and the network gateway is configured to generate the revised transaction authorization cryptogram from the token cryptogram and the received transaction authorization.

17. An online transaction processing network comprising:
a client terminal configured to communicate with an identity token interfaced therewith;
an issuer server; and
a network gateway configured to:
receive an incoming transaction request from a client terminal, the incoming transaction request including an original payment amount and a token cryptogram and identifying an identity token;
confirm that the token cryptogram was generated from the original payment amount and from a token cryptographic key uniquely associated with the identity token;
generate a revised transaction message, the revised transaction message including an adjusted payment amount different from the original payment amount;
generate a revised transaction request cryptogram from the adjusted payment amount and from the token cryptographic key;
generate a revised transaction request, the revised transaction request including the revised transaction message and the revised transaction request cryptogram;
transmit the revised transaction request to the issuer sever, and receive a transaction authorization from the issuer server in response to the revised transaction request, the transaction authorization including a confirmation that the revised transaction request cryptogram was generated from the adjusted payment amount and the token cryptographic key; and
generate a revised transaction authorization message from the received transaction authorization, and provide the revised transaction authorization message to the client terminal, the revised transaction authorization message including a confirmation of approval of the revised transaction request.

18. The processing network according to claim 17, further comprising a computer server, and wherein the incoming transaction request includes an identification number identifying the identity token, and, and the network gateway is configured to generate the revised transaction message by transmitting a portion of the incoming transaction request to the computer server, receiving an adjustment message from the computer server and generating the adjusted payment amount from the adjustment message and the incoming transaction request, the computer server generating the adjustment message from at least the identification number.

19. The processing network according to claim 18, wherein the incoming transaction request includes an incoming transaction message, and the revised transaction authorization message includes the incoming transaction message and the adjustment message.

20. The processing network according to claim 17, wherein the incoming transaction request includes an identification number identifying the identity token, the revised transaction message includes the identification number, and the network gateway is configured to generate the token cryptographic key from the identification number.

21. The processing network according to claim 20, wherein the network gateway is configured to generate the revised transaction request cryptogram further from the incoming transaction request.

22. The processing network according to claim 17, wherein the revised transaction authorization message includes a revised transaction authorization cryptogram, and the network gateway is configured to generate the revised transaction authorization cryptogram from the token cryptogram and the received transaction authorization.

23. The processing network according to claim 17, wherein the revised transaction message includes an account identification number identifying the identity token, and the issuer server is configured to receive the revised transaction request from the network gateway, recover the token cryptographic key from the account identification number, confirm that the revised transaction request cryptogram was generated from the recovered token cryptographic key, validate the revised transaction request from the revised transaction request cryptogram, and generate the transaction authorization from the adjusted payment amount and the revised transaction request cryptogram.

24. The processing network according to claim 17, further comprising a front-end switch configured to direct the incoming transaction request to the network gateway in accordance with a data field of the incoming transaction request.

* * * * *